(12) United States Patent
Ogawa

(10) Patent No.: US 6,886,900 B2
(45) Date of Patent: May 3, 2005

(54) INKJET IMAGE FORMING APPARATUS AND INKJET IMAGE FORMING METHOD

(75) Inventor: Tatsuya Ogawa, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 69 days.

(21) Appl. No.: 10/445,048

(22) Filed: May 27, 2003

(65) Prior Publication Data

US 2003/0218647 A1 Nov. 27, 2003

(30) Foreign Application Priority Data

May 27, 2002 (JP) ........................................ 2002-152735

(51) Int. Cl.⁷ .............................. B41J 29/38; B41J 2/01
(52) U.S. Cl. ...................................... 347/16; 347/104
(58) Field of Search ......................... 347/16, 101, 102, 347/104

(56) References Cited

U.S. PATENT DOCUMENTS 6,592,198 B2 * 7/2003 Shoji et al. .................... 347/16

FOREIGN PATENT DOCUMENTS

JP 62-2777 A 1/1987
JP 10-329333 A 12/1998

* cited by examiner

*Primary Examiner*—Stephen D. Meler
*Assistant Examiner*—Alfred Dudding
(74) *Attorney, Agent, or Firm*—Birch, Stewart, Kolasch & Birch, LLP.

(57) ABSTRACT

In an inkjet printer, when image forming operation(s) is or are interrupted, if print coverage(s) at recording paper prior to such interruption(s) is or are not more than prescribed value(s), recording medium or media undergo normal transport when operation(s) resume so as to permit image forming operation(s) which was or were underway at recording paper to resume. If print coverage(s) exceed prescribed value(s), recording paper is forcibly discharged when operation(s) resume.

10 Claims, 13 Drawing Sheets

(a)

(b)

(a)

(b)

INKJET IMAGE FORMING APPARATUS AND INKJET IMAGE FORMING METHOD

This nonprovisional application claims priority under 35 U.S.C. §119(a) on Patent Application No(s). 2002-152735 filed in JAPAN on May 27, 2002, which is (are) herein incorporated by reference.

BACKGROUND OF INVENTION (1) Field of Invention

The present invention pertains to an inkjet image forming apparatus employing ink droplets jetted from one or more printheads to form one or more images on one or more recording media and to an inkjet image forming method executed in the context of such an inkjet image forming apparatus. In particular, the present invention relates to improved measures adoptable when image forming operations are interrupted.

(2) Conventional Art

Conventional image forming operations in inkjet image forming apparatuses (hereinafter "inkjet printers") are such that one sheet among a plurality of sheets of paper housed in a supply tray is first delivered to a transport path, this paper being supplied by way of the transport path to an image forming unit. In addition, at this image forming unit, ink droplets are jetted onto the surface of the paper to form a prescribed image, and this paper is thereafter discharged to an outlet tray.

Furthermore, in serial-head-type inkjet printers, a carriage provided at the image forming unit carries ink cartridges, the aforementioned image forming operations being carried out as a result of ink which is supplied to the printhead from the ink cartridges as the carriage performs scanning operations.

With such inkjet printers, in the event that an ink cartridge runs out of ink or some other problem occurs during the course of image forming operations, such image forming operations would have to be interrupted. Known as one disclosure of processing operations which may be carried out in the event that image forming operations are interrupted in such fashion is Japanese Patent Application Publication Kokai No. S62-2777 (1987). This publication discloses interrupting image forming operations and forcibly discharging the recording paper without further processing in the event that some abnormal event occurs (e.g., if supplied electric current exceeds some allowed peak value for a fixed period of time, etc.) while image forming operations are underway. In other words, the art disclosed in this publication is such that the recording paper is forcibly discharged following interruption of image forming operations even where circumstances are such that it would have been possible to resume image forming operations, continuing from where they had been left off, without ill effect. For this reason, not only does the recording paper go to waste, but the image forming operations which were being carried out prior to the interruption also go to waste.

Known as a solution to this problem is the inkjet image forming apparatus disclosed at Japanese Patent Application Publication Kokai No. H10-329333 (1998). This publication discloses interrupting image forming operations and resuming image forming operations without forcibly discharging recording paper following refilling of ink (cartridge replacement) when an ink cartridge runs out of ink while image forming operations are underway.

However, in recent years there is a trend toward increased number of nozzles on printheads in response to demand for increased speed of image forming operations. For example, in the aforementioned serial-head-type inkjet printer, by increasing the number of nozzles in the cross-scan direction of the printhead (the paper transport direction) it is possible to increase the size of the region over which image forming operations are carried out during a single scan pass, permitting the number of scan passes necessary to carry out image formation on a single sheet of recording paper to be decreased and permitting the time required for image formation to be reduced.

When thus increasing number of nozzles in the cross-scan direction of the printhead, there is a tendency for the dimension of the printhead in the cross-scan direction to increase in length. In accompaniment thereto, as shown at FIG. 10(a), distance T between shafts of pairs of rollers 42, 61 located to either side of printhead 52 in the cross-scan direction therefrom which respectively form nips for transport of recording paper P must also increase in length. The fact that this distance T between shafts of rollers increases means that the distance in the transport direction between the nips which sandwich and support the recording paper P during transport thereof will also increase in length.

Now, it is ordinarily the case that because the foregoing inkjet printer is such that image forming operations are carried out with ink droplets being jetted onto one side (the top) of recording paper P, the side of recording paper P onto which the ink droplets fall will swell in accompaniment to absorption of the ink. In accompaniment to this swelling at one side thereof, recording paper P will become bowed to some extent.

During normal image forming operations, because image formation on a single sheet of recording paper P is completed within a comparatively short time, this bowing of recording paper P is small and is rarely a problem.

However, in the event of interruption of image forming operations as a result of occurrence of some abnormal event during the course of image forming operations as described above, the foregoing swelling will progress and the bowing of recording paper P will increase as the time until resumption of image forming operations following such interruption grows longer. In particular, where the distance between shafts of respective rollers 42, 61 is large in order to accommodate a large number of nozzles at printhead 52 as described above, because the region of occurrence (area) of bowing on recording paper P will be large, there is a tendency for the amount of bowing (deflection) of recording paper P to increase. Under such conditions, as shown in FIG. 10(b), the surface of recording paper P may contact printhead 52. Where image forming operations are resumed without forcible discharge of recording paper P when operations are resumed, such as is disclosed at the aforementioned Japanese Patent Application Publication Kokai No. H10-329333 (1998), this can result in continuation of image forming operations on a sheet of recording paper P whose surface has become smeared or otherwise dirtied due to contact with printhead 52, and may in some cases even lead to paper jams and/or damage to printhead 52.

One approach for avoiding such contact of recording paper P with printhead 52 might be to set the distance between recording paper P and printhead 52 (dimension t at FIG. 10(a)) in advance such that it is a large value. But this is not preferred, since it would increase the flight distance traveled by ink droplets jetted from the nozzles of printhead 52 in reaching the surface of the recording paper, causing the location at which ink lands on the recording paper to shift and creating opportunities for deterioration in image quality.

Alternatively, when image forming operations are interrupted, it is possible that contact of recording paper P with printhead 52 might be avoided if printhead 52 were moved to a location (home position, etc.) at which it was not facing recording paper P. However, during resumption of image forming operations under such circumstances, if occurrence of the foregoing bowing were to cause recording paper P to reach the region through which printhead 52 passes (if recording paper P were to bow as far as the location shown in FIG. 10 (*b*)), the side of printhead 52 might collide with the edge of recording paper P, leading to damage of recording paper P and/or printhead 52.

SUMMARY OF INVENTION

The present invention was conceived in light of such points, it being an object thereof to provide an inkjet image forming apparatus and an inkjet image forming method permitting prevention of adverse effects of bowing due to swelling of recording paper where image forming operations have been interrupted, without the need to set the distance between recording paper and printhead in advance such that it is a large value.

In order to achieve the foregoing object and/or other objects, an embodiment of the inkjet image forming apparatus of the present invention, in the context of an inkjet image forming apparatus employing ink droplets jetted from one or more printheads to form one or more images on one or more recording media, is characterized in that it is equipped with one or more interruption detection means capable of detecting one or more interruptions of one or more image forming operations; one or more print coverage determination means capable of determining one or more print coverages applicable to at least one of the recording medium or media at one or more times prior to at least one of the interruption or interruptions of image forming operation or operations; and one or more transport altering means capable of receiving output from at least one of the print coverage determination means and capable of, at one or more times when operation or operations resume following at least one of the interruption or interruptions of image forming operation or operations, altering one or more recording medium transport operations in correspondence to at least one of the print coverage or coverages.

Furthermore, at least one of the transport altering means may be constructed so as to cause at least one of the recording medium or media to undergo normal transport so as to permit at least one of the image forming operation or operations which was underway on at least one of the recording medium or media to resume at at least one of the time or times when operation or operations resume in the event that at least one of the print coverage or coverages applicable to at least one of the recording medium or media determined by at least one of the print coverage determination means at at least one of the time or times prior to at least one of the interruption or interruptions of image forming operation or operations is not more than one or more prescribed values; but so as to cause forced discharge of at least one of the recording medium or media at at least one of the time or times when operation or operations resume in the event that at least one of the print coverage or coverages exceeds at least one of the prescribed value or values.

The greater the aforesaid print coverage the greater will be the amount of ink jetted onto the recording medium or media, in accompaniment to which there will be greater tendency for bowing to occur due to swelling of the recording medium or media. In other words, at time(s) when image forming operation(s) have been interrupted, there will be greater likelihood that recording medium or media will come in contact with printhead(s) during the course of the interruption(s) if the print coverage(s) up to that point was or were high.

In accordance with an inkjet image forming apparatus constructed as described above, image forming operation(s) which was or were underway at recording medium or media will be resumed only if print coverage(s) was or were not more than prescribed value(s), recording medium or media otherwise (i.e., where there is a high likelihood that recording medium or media has/have or would come in contact with printhead(s)) being forcibly discharged. This permits elimination, when print coverage(s) is or are not more than prescribed value(s), of situations where recording medium or media would go to waste and/or situations where image forming operation(s) which occurred prior to interruption(s) would go to waste. Furthermore, this also permits elimination, when print coverage(s) exceed prescribed value(s), of resumption of image forming operations on smeared or otherwise dirtied recording medium or media.

Alternatively, in order to achieve the foregoing object and/or other objects, an embodiment of the inkjet image forming apparatus of the present invention, in the context of an inkjet image forming apparatus employing ink droplets jetted from one or more printheads to form one or more images on one or more recording media, is characterized in that it is equipped with one or more interruption detection means capable of detecting one or more interruptions of one or more image forming operations; one or more type detection means capable of detecting at least one type of at least one of the recording medium or media; and one or more transport altering means capable of receiving output from at least one of the type detection means and capable of, at one or more times when operation or operations resume following at least one of the interruption or interruptions of image forming operation or operations, altering one or more recording medium transport operations in correspondence to at least one of the type or types of recording medium or media.

Furthermore, at least one of the transport altering means may be constructed so as to cause at least one of the recording medium or media to undergo normal transport so as to permit at least one of the image forming operation or operations which was underway on at least one of the recording medium or media to resume at at least one of the time or times when operation or operations resume in the event that at least one of the type or types of recording medium or media detected by at least one of the type detection means is special-purpose inkjet paper; but so as to cause forced discharge of at least one of the recording medium or media at at least one of the time or times when operation or operations resume in the event that at least one of the type or types of recording medium or media is plain paper.

Where the type of recording medium is special-purpose inkjet paper, there will be almost no swelling of the recording medium, and almost no occurrence of bowing thereat, even when a comparatively large amount of ink has been jetted thereon. In contrast, where the type of recording medium is plain paper, there will be swelling of the recording medium, and significant occurrence of bowing thereat, even when a comparatively small amount of ink has been jetted thereon. In other words, at time(s) when image forming operation(s) have been interrupted, there will be greater likelihood that recording medium or media will come in contact with printhead(s) during the course of the interruption(s) if the type of recording medium or media is plain paper.

In accordance with an inkjet image forming apparatus constructed as described above, image forming operation(s) which was or were underway at recording medium or media will be resumed if the type of recording medium or media is special-purpose inkjet paper, but recording medium or media will be forcibly discharged if the type of recording medium or media is plain paper. This permits elimination, when recording medium or media is or are special-purpose inkjet paper, of situations where recording medium or media would go to waste and/or situations where image forming operation(s) which occurred prior to interruption(s) would go to waste. Furthermore, this also permits elimination, when recording medium or media is or are plain paper, of resumption of image forming operations on smeared or otherwise dirtied recording medium or media.

Alternatively, in order to achieve the foregoing object and/or other objects, an embodiment of the inkjet image forming apparatus of the present invention, in the context of an inkjet image forming apparatus employing ink droplets jetted from one or more printheads to form one or more images on one or more recording media, is characterized in that it is equipped with one or more interruption detection means capable of detecting one or more interruptions of one or more image forming operations; one or more interruption time calculation means capable of calculating one or more interruption times, each such interruption time being a time elapsed from one of the time or times of interruption of image forming operation or operations to one of one or more times when operation or operations resume; and one or more transport altering means capable of receiving output from at least one of the interruption time calculation means and capable of, at at least one of the time or times when operation or operations resume following at least one of the interruption or interruptions of image forming operation or operations, altering one or more recording medium transport operations in correspondence to at least one of the interruption time or times.

Furthermore, at least one of the transport altering means may be constructed so as to cause at least one of the recording medium or media to undergo normal transport so as to permit at least one of the image forming operation or operations which was underway on at least one of the recording medium or media to resume at at least one of the time or times when operation or operations resume in the event that at least one of the interruption time or times calculated by at least one of the interruption time calculation means is not more than one or more prescribed values; but so as to cause forced discharge of at least one of the recording medium or media at at least one of the time or times when operation or operations resume in the event that at least one of the interruption time or times exceeds at least one of the prescribed value or values.

The greater the aforesaid interruption time(s) the more the swelling of the recording medium or media will have progressed, and the greater will be the likelihood that bowing has occurred or will occur. In other words, for long interruption time(s), there is greater likelihood that recording medium or media have come in contact with printhead(s) during the course of the interruption(s).

In accordance with an inkjet image forming apparatus constructed as described above, image forming operation(s) which was or were underway at recording medium or media will be resumed only if interruption time(s) was or were not more than prescribed value(s), recording medium or media otherwise (i.e., where there is a high likelihood that recording medium or media has/have or would come in contact with printhead(s)) being forcibly discharged. This permits elimination, when interruption time(s) is or are not more than prescribed value(s), of situations where recording medium or media would go to waste and/or situations where image forming operation(s) which occurred prior to interruption(s) would go to waste. Furthermore, this also permits elimination, when interruption time(s) exceed prescribed value(s), of resumption of image forming operations on smeared or otherwise dirtied recording medium or media.

Alternatively, in order to achieve the foregoing object and/or other objects, an embodiment of the inkjet image forming apparatus of the present invention, in the context of an inkjet image forming apparatus employing ink droplets jetted from one or more printheads to form one or more images on one or more recording media, is characterized in that it is equipped with one or more interruption detection means capable of detecting one or more interruptions of one or more image forming operations; at least two species of means selected from among the group of three species of means consisting of one or more print coverage determination means capable of determining one or more print coverages applicable to at least one of the recording medium or media at one or more times prior to at least one of the interruption or interruptions of image forming operation or operations, one or more type detection means capable of detecting at least one type of at least one of the recording medium or media, and one or more interruption time calculation means capable of calculating one or more interruption times, each such interruption time being a time elapsed from one of the time or times of interruption of image forming operation or operations to one of one or more times when operation or operations resume; and one or more transport altering means capable of receiving output from the at least two species of means and capable of, at one or more times when operation or operations resume following at least one of the interruption or interruptions of image forming operation or operations, altering one or more recording medium transport operations in correspondence to output from the at least two species of means.

In accordance with an inkjet image forming apparatus constructed as described above, combination of a plurality of species of solution means selected from among the aforementioned three species of solution means makes it possible to accurately determine when bowing due to swelling of recording medium or media is likely to have occurred or is likely to occur and makes it possible to achieve more highly reliable operations in connection with operations for transport of recording medium or media when operations resume.

Furthermore, in any of the embodiments of inkjet image forming apparatuses described above, at least two transport rollers may be respectively provided in at least one transport path of at least one of the recording medium or media, at least one transport roller being provided upstream of and at least one transport roller being provided downstream of at least one of the printhead or printheads; and at least one of the transport altering means may be constructed such that rotation of at least one of the downstream transport roller or rollers commences before the start of rotation of at least one of the upstream transport roller or rollers at at least one of the time or times when operation or operations resume following at least one of the interruption or interruptions of image forming operation or operations.

In accordance with an inkjet image forming apparatus constructed as described above, even where conditions are such as to cause bowing of recording medium or media, bowing of recording medium or media can be mitigated by first causing only transport roller(s) which is or are downstream in the recording medium transport direction to rotate at time(s) when operation(s) resume following interruption(s) of image forming operation(s). By thereafter starting rotation of transport roller(s) which is or are upstream in the recording medium transport direction, it is possible to resume transport operations while recording medium or media is or are maintained in a flat state. That is, where recording medium or media can be transported normally such that image forming operation(s) which was or were underway at recording medium or media can be resumed, execution of image forming operation(s) on recording medium or media whose bowing has been mitigated will permit good image quality to be maintained. On the other hand, where recording medium or media is or are forcibly discharged, it is possible to avoid situations where recording medium or media would have been transported while recording medium or media was or were still in contact with printhead(s), permitting prevention of damage to recording medium or media and or printhead(s).

Alternatively, in order to achieve the foregoing object and/or other objects, an embodiment of the inkjet image forming method of the present invention, in the context of an inkjet image forming method wherein ink droplets are jetted from one or more printheads to form one or more images on one or more recording media, is characterized in that at one or more times when operation or operations resume following one or more interruptions of image forming operation or operations, recording medium transport operation or operations occur through control executed by at least one of the transport altering means in any of the embodiments of inkjet image forming apparatuses described above.

Such an embodiment of an inkjet image forming method in accordance with the present invention will permit prevention of adverse effects of bowing due to swelling of recording paper where image forming operations have been interrupted, without the need to set the distance between recording paper and printhead in advance such that it is a large value.

DESCRIPTION OF PREFERRED EMBODIMENTS

Below, embodiments of the present invention are described with reference to the drawings. Through the vehicle of the present embodiment, application of the present invention to a color inkjet printer is described.

(First Embodiment)

Figure 1:
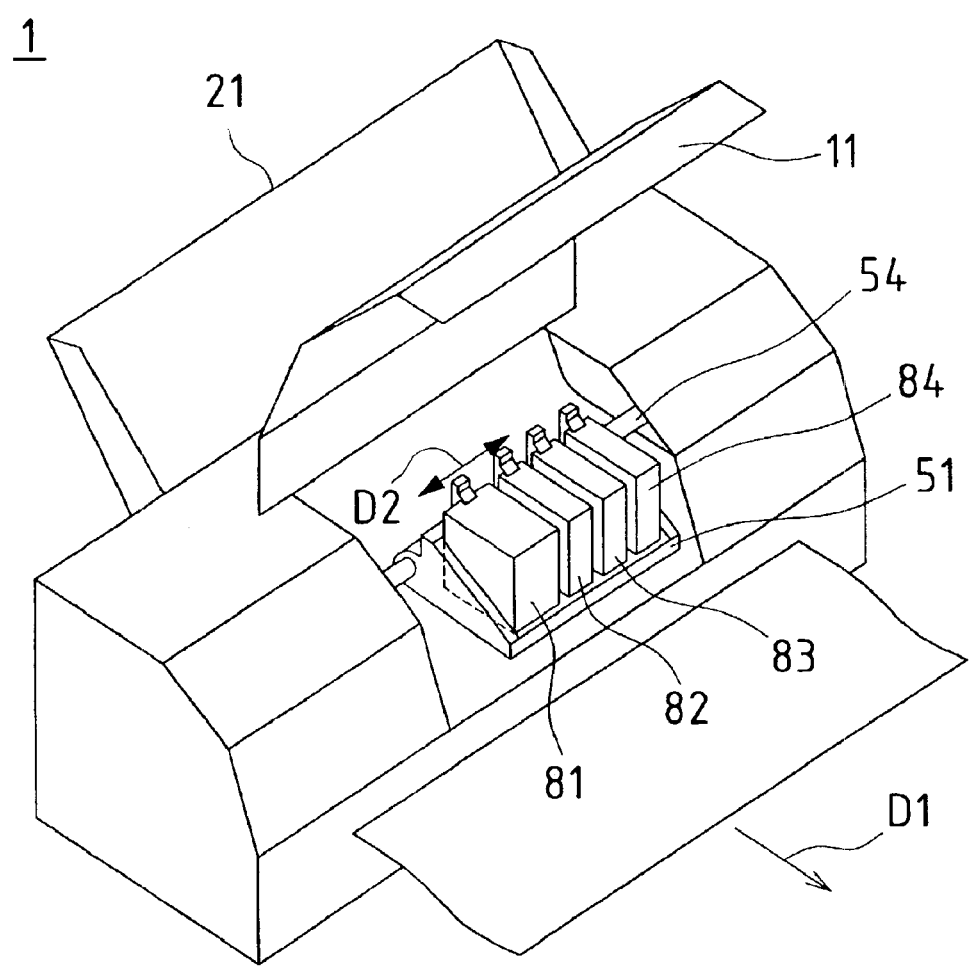
FIG. 1 is an oblique view showing the external appearance of a color inkjet printer associated with one or more embodiments.
Figure 2:
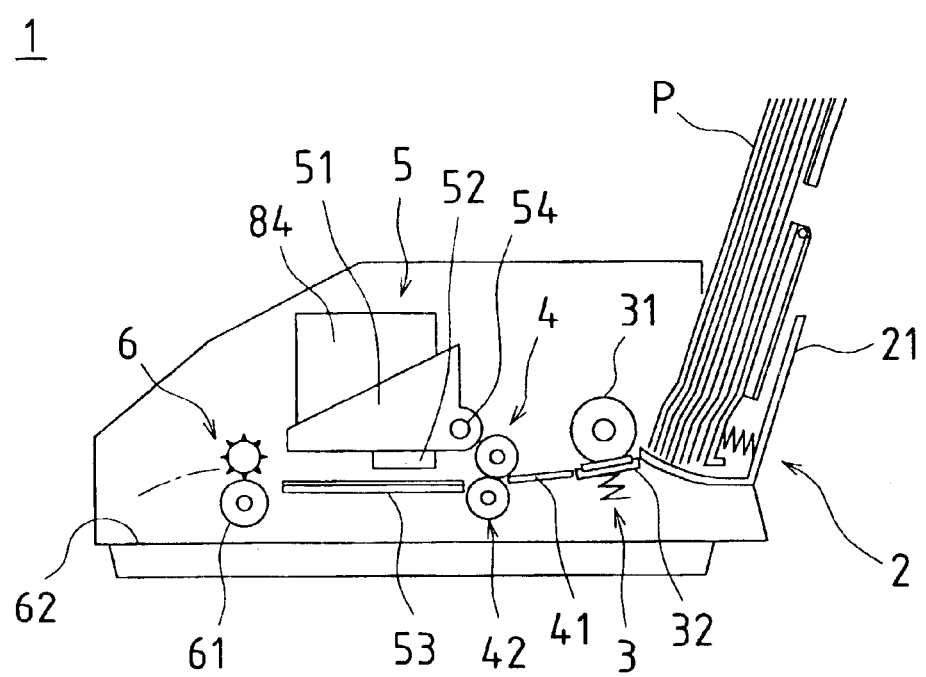
FIG. 2 is a side view showing the internal constitution of a color inkjet printer.

A first embodiment will first be described. FIG. 1 is an oblique view showing the external appearance (shown with cover 11 open) of a color inkjet printer 1 associated with the present embodiment. Furthermore, FIG. 2 is a side view showing the internal constitution of color inkjet printer 1.

As shown in these drawings, color inkjet printer 1 associated with the present embodiment is provided with media supply unit 2, separating unit 3, transport unit 4, image forming unit 5, and discharge unit 6.

Media supply unit 2 is provided with media supply tray 21 extending in a more or less vertical direction and a pickup roller, not shown, and at a time when image forming operations are initiated, recording paper P serving as recording media within media supply tray 21 is removed therefrom by the pickup roller so as to be transported toward separating unit 3. Furthermore, at times when image forming operations are not being carried out, the aforementioned media supply tray 21 functions as storage unit for recording paper P.

Separating unit 3, for supplying recording paper P supplied thereto from media supply unit 2 to image forming unit 5 one sheet at a time, is provided with supply roller 31 and separator 32. At separator 32, the force of friction between a pad region (region of contact with recording paper P) and recording paper P is set so as to be greater than the force of friction between sheets of recording paper P, P. Furthermore, at supply roller 31, the force of friction between this supply roller 31 and recording paper P is set so as to be greater than the force of friction between the pad region of separator 32 and recording paper P and greater than the force of friction between respective sheets of recording paper P, P. For this reason, even if multiple sheets of recording paper P, P, . . . are picked up by the pickup roller and are fed to separating unit 3, supply roller 31 will be able to separate these multiple sheets of recording paper P, P, . . . and feed only the topmost sheet of recording paper P to transport unit 4.

Transport unit 4, for transporting to image forming unit 5 recording paper P supplied thereto one sheet at a time from separating unit 3, is provided with guide plate 41 and pair of transport rollers 42. Transport roller pair 42 is a member for adjusting transport of recording paper P so as to cause ink droplets from printhead 52 to be jetted onto recording paper P at an appropriate location thereof when recording paper P is fed between printhead 52 and platen 53.

Image forming unit 5, for carrying out formation of images on recording paper P supplied thereto from transport roller pair 42 of transport unit 4, is provided with plurality of ink cartridges 81 through 84, printhead 52, carriage 51 carrying these ink cartridges 81 through 84 and this printhead 52, guide shaft 54 for guiding this carriage 51 in a scan direction, and the aforementioned platen 53 serving as support stage for recording paper P during image formation. Furthermore, the aforementioned ink cartridges 81 through 84 are such that separate cartridges for each of Bk (black), Y (yellow), M (magenta), and C (cyan) inks are respectively installed at carriage 51, permitting each to be replaced independent of the others. Furthermore, in the present embodiment, of the respective ink cartridges 81 through 84, Bk ink cartridge 81 is of larger capacity than respective Y, M, and C color ink cartridges 82 through 84.

Discharge unit 6, being a component for retrieval of recording paper P on which image formation has been carried out, is provided with an ink drying unit (not shown) for drying ink present on recording paper P, discharge roller 61, and discharge tray 62.

In the context of the foregoing constitution, color inkjet printer 1 carries out image formation by means of operations such as the following. First, a request for color inkjet printer 1 to use image information to carry out image formation is made from a computer or other such external terminal, not shown. Color inkjet printer 1, having received the image formation request, uses the pickup roller to cause recording paper P in media supply tray 21 to exit media supply unit 2. Next, recording paper P, having exited therefrom, is by means of supply roller 31 made to pass through separating unit 3 and to be delivered to transport unit 4. At transport unit 4, transport roller pair 42 causes recording paper P to be fed between printhead 52 and platen 53. In addition, at image forming unit 5, ink droplets are jetted from ink jets present on printhead 52 onto recording paper P lying on platen 53 in correspondence to image information. At this time, movement of recording paper P is paused as it is held stationary over platen 53. Carriage 51, guided by guide shaft 54, is made to scan in a motion corresponding to one line in the scan direction (the D2 direction at FIG. 1) while ink droplets are jetted therefrom. Upon completion thereof, recording paper P is made to move over platen 53 by a fixed distance in the cross-scan direction (the D1 direction at FIG. 1). At image forming unit 5, by continuing to perform the foregoing processing in correspondence to image information, image formation is carried out over the entire expanse of recording paper P. Recording paper P, image formation having thus been carried out thereon, passes through the ink drying unit and is discharged by discharge roller 61 into discharge tray 62. As a result hereof, recording paper P is provided to the user as printed output.

The foregoing operations of the various components may be controlled by a controller. Such a controller is described below.

Figure 3A:
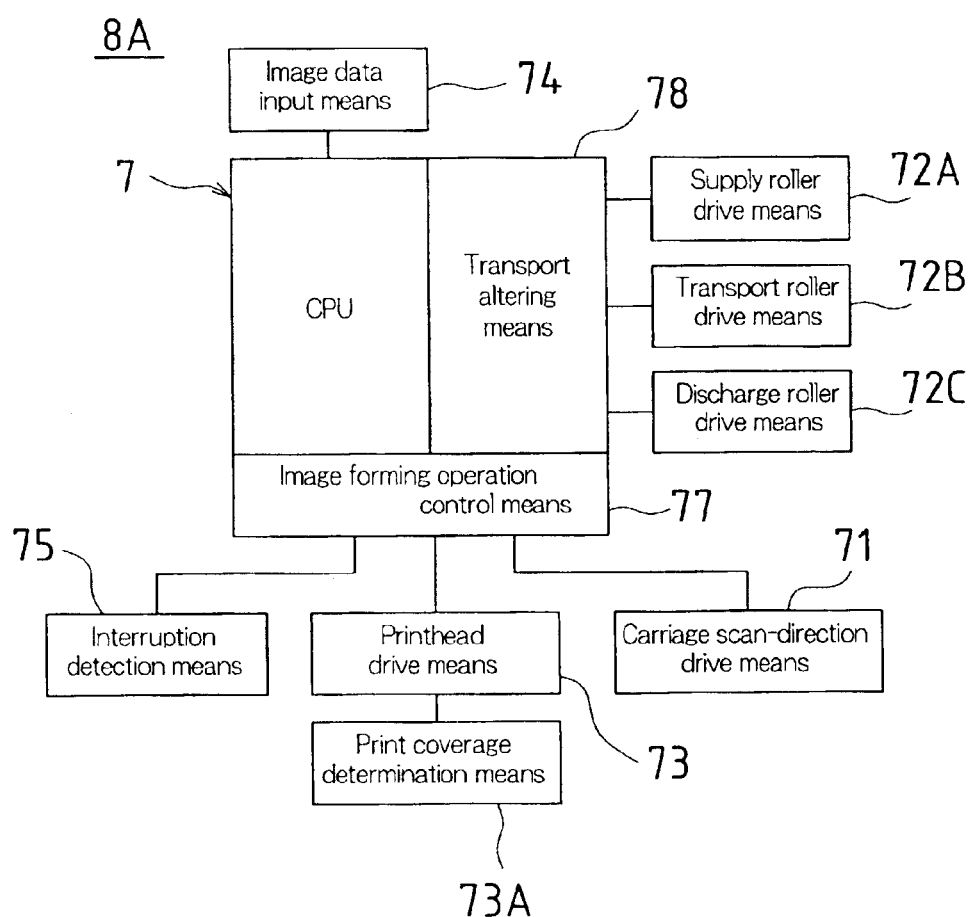
FIG. 3(a) is a block diagram showing the constitution of a controller for a color inkjet printer associated with a first embodiment.

FIG. 3(a) is a block diagram showing the constitution of a controller 8A for a color inkjet printer 1 associated with the present embodiment. This controller 8A is equipped with carriage scan-direction drive means 71; the three means represented by supply roller drive means 72A, transport roller drive means 72B, and discharge roller drive means 72C, these being means for transport of paper; printhead drive means 73; and image data input means 74 which are controlled by CPU 7.

Carriage scan-direction drive means 71 controls driving of a carriage motor which represents the motive force for causing the aforementioned carriage 51 to move back and forth in the scan direction.

Respective roller drive means 72A, 72B, and 72C respectively control driving of the aforementioned supply roller 31, transport roller pair 42, and discharge roller 61 which are arranged along the transport path of recording paper P.

Printhead drive means 73 controls driving of printhead 52 based on image data received by image data input means 74. That is, control of jetting of ink droplets from respective ink jets is carried out such that a plurality of piezoelectric elements provided at the black printhead subunit and at the respective color printhead subunits are driven in cooperation with the aforementioned scanning of carriage 51 and transport of recording paper P to form prescribed image(s) on recording paper P, the piezoelectric element(s) for each ink color being driven independently of the piezoelectric element(s) for the other ink colors.

Furthermore, CPU 7 is equipped with image forming operation control means 77. Stored within this image forming operation control means 77 is an image-recording-control-type control program or the like that controls the aforementioned carriage scan-direction drive means 71; respective roller drive means 72A, 72B, and 72C; and printhead drive means 73 to record color image(s) on recording paper P.

Furthermore, connected to CPU 7 is a communication interface (not shown) which is connected to a host computer or the like by way of a connecting cable and which is capable of receiving image data sent thereto from this host computer or the like.

In addition, characteristic of the present embodiment is the fact that the aforementioned controller 8A is provided with interruption detection means 75 and print coverage determination means 73A, and moreover, CPU 7 is provided with transport altering means 78.

In the event that one or more of the ink cartridge(s) run out of ink or some other abnormal event occurs while image forming operations are underway and image forming operations are interrupted, interruption detection means 75 detects such interruption and sends a signal communicating such detected interruption to CPU 7.

Print coverage determination means 73A determines print coverage(s) applicable to recording paper P prior to interruption of image forming operations; i.e., prior to detection of interruption of image forming operations by the aforementioned interruption detection means 75. The higher the value(s) of such print coverage(s) the greater will be the quantity of ink droplets jetted onto recording paper P. The quantity of ink droplets jetted onto recording paper P prior to interruption is determined as a result of determination of such print coverage(s), and this in turn permits the situation with respect to swelling of recording paper P to be determined. Such determination of print coverage(s) may be carried out based on image data received by the aforementioned image data input means 74.

Transport altering means 78 receives output from the aforementioned print coverage determination means 73A and alters transport operations in connection with transport of recording paper P in correspondence to the aforementioned print coverage(s) when operations resume following interruption of image forming operations. More specifically, if print coverage(s) at recording paper P prior to interruption of image forming operations was or were not more than prescribed value(s) (e.g., 60% coverage), recording paper P undergoes normal transport when operations resume so as to permit image forming operations which were underway at recording paper P to resume. However, if the aforementioned print coverage(s) at recording paper P prior to interruption of image forming operations exceeds or exceed prescribed value(s), recording paper P is forcibly discharged when operations resume. In other words, because the quantity of ink droplets jetted onto recording paper P will be comparatively small when print coverage(s) at recording paper P prior to interruption of image forming operations was or were not more than prescribed value(s), swelling of recording paper P, and likewise bowing thereof, will also be minimal. Because when operations resume it is therefore possible to resume image forming operations which were underway at recording paper P, normal transport of recording paper P is carried out. However, because the quantity of ink droplets jetted onto recording paper P will be comparatively large when print coverage(s) at recording paper P prior to interruption of image forming operations exceeds or exceed prescribed value(s), swelling of recording paper P, and likewise bowing thereof, will be significant. Since there is therefore a significant possibility that recording paper P has or would come in contact with printhead 52, and since resumption, when operations resume, of the image forming operations which were underway at recording paper P would therefore most likely only result in waste of recording paper P and/or waste of ink, recording paper P is forcibly discharged.

Figure 4:
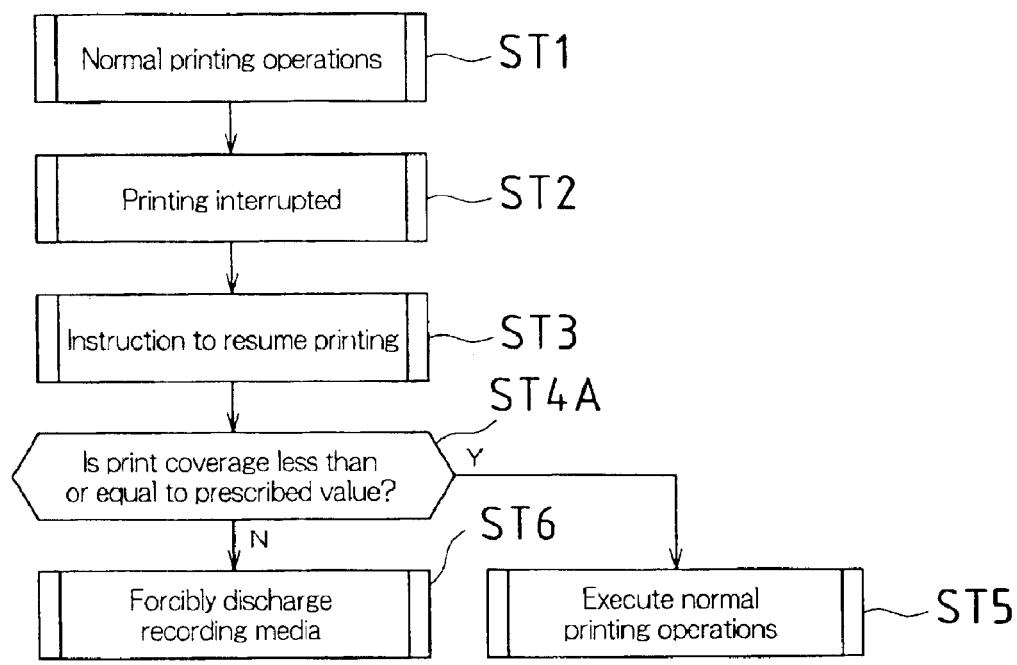
FIG. 4 is a flowchart showing a control procedure which may be employed when image forming operations are interrupted in the context of the first embodiment.

Following the flowchart of FIG. 4, a control procedure which may be employed in the context of the present embodiment when image forming operations are interrupted will next be described. Beginning with a situation where normal image forming operations (printing operations) are being carried out at step ST1, occurrence of an abnormal event such as an ink cartridge running out of ink causes image forming operations to be interrupted (step ST2). When resumption of operations thereafter becomes possible as a result of ink cartridge replacement or the like, instruction to resume image forming operations (instruction to resume printing) is issued to CPU 7 (step ST3). In accompaniment to such instruction to resume image forming operations, transport altering means 78 receives output from print coverage determination means 73A and determines whether print coverage(s) at recording paper P prior to interruption of image forming operations was or were not more than prescribed value(s) (step ST4A). Here, if print coverage(s) is or are not more than prescribed value(s), normal transport of recording paper P is carried out so as to permit image forming operations which were underway at recording paper P to resume (step ST5). On the other hand, if print coverage(s) exceed prescribed value(s), recording paper P is forcibly discharged (step ST6).

As described above, at time(s) when image forming operation(s) have been interrupted, there will be greater likelihood that recording paper P will come in contact with printhead 52 during the course of the interruption(s) if the print coverage(s) up to that point was or were high. In the present embodiment, image forming operation(s) which was or were underway at recording paper P will therefore be resumed only if print coverage(s) was or were not more than prescribed value(s), recording paper P otherwise (i.e., where there is a high likelihood that recording paper P has or would come in contact with printhead 52) being forcibly discharged. This permits elimination, when print coverage(s) is or are not more than prescribed value(s), of situations where recording paper P would go to waste and/or situations where image forming operation(s) which occurred prior to interruption(s) would go to waste. Furthermore, this also permits elimination, when print coverage(s) exceed prescribed value(s), of resumption of image forming operations on smeared or otherwise dirtied recording paper P.

(Second Embodiment)

A second embodiment will next be described. At the foregoing first embodiment, when operations resumed following interruption of image forming operations, transport operations affecting recording paper P were altered in correspondence to print coverage up to that point. In the present embodiment, transport operations affecting recording paper P are instead altered in correspondence to type of recording paper P. As constitution and operation are in other respects similar to the foregoing first embodiment, description will here be carried out only with respect to those aspects of constitution and operation which differ from the first embodiment.

Figure 3B:
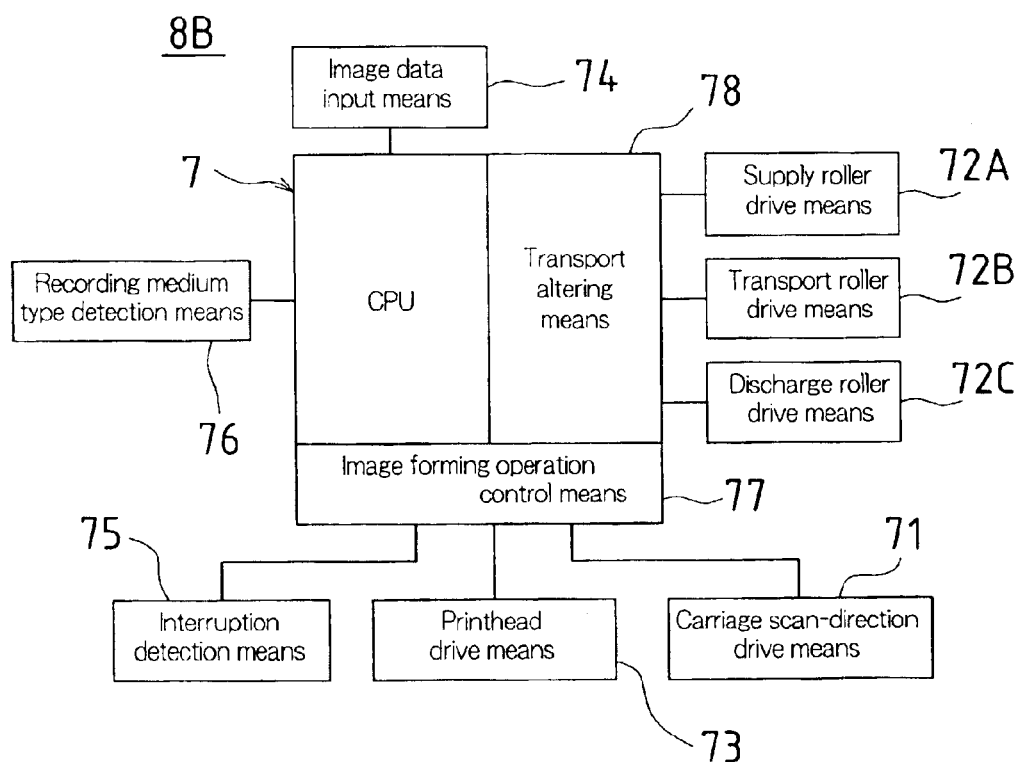
FIG. 3(b) is a block diagram showing the constitution of a controller for a color inkjet printer associated with a second embodiment.
Figure 5:
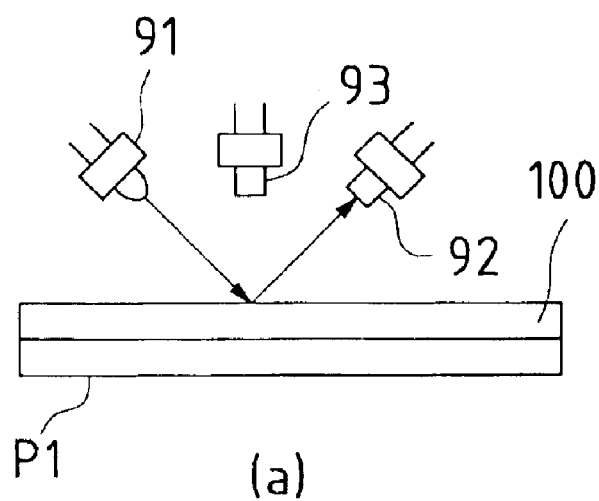
FIG. 5(a) is a drawing showing arrangement of elements for detecting recording paper type, a situation that might exist when recording paper type is special-purpose inkjet paper being shown.
FIG. 5(b) is a drawing showing arrangement of elements for detecting recording paper type, a situation that might exist when recording paper type is plain paper being shown.
Figure 5:
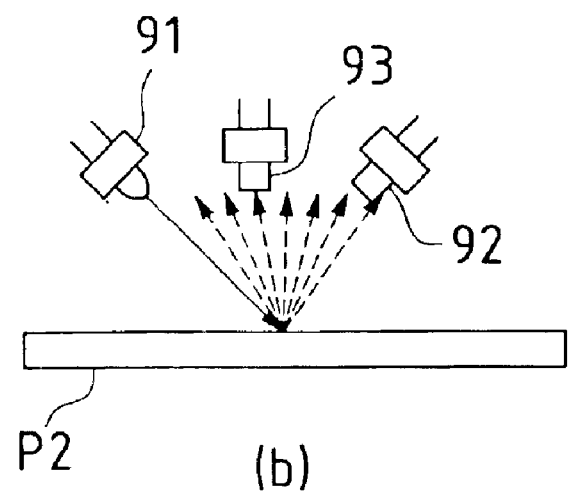

FIG. 3(b) is a block diagram showing the constitution of a controller 8B for a color inkjet printer 1 associated with the present embodiment. This controller 8B is equipped with recording medium type detection means 76 instead of the print coverage determination means 73A with which controller 8A of the first embodiment (see FIG. 3(a)) was equipped. This recording medium type detection means 76 detects type(s) of recording paper P being transported along transport path(s). More specifically, as shown at FIGS. 5(a) and (b), recording medium type detection means 76 (not shown in FIGS. 5(a) and (b)) is provided with light emitting element(s) 91 capable of projecting light toward recording paper P as it is transported along transport path(s), and first and second light receiving elements 92, 93 capable of receiving this projected light after it is reflected from recording paper P. In the event that the type of recording paper P is special-purpose inkjet paper PI, i.e., in the event that the surface of the paper is glossy, almost all of the foregoing reflected light will be reflected toward first light receiving element 92 (see FIG. 5(a)). That is, when the amount of light received by first light receiving element 92 is much greater than the amount of light received by second light receiving element 93, it will be possible to determine that the type of recording paper P is special-purpose inkjet paper P1. Conversely, in the event that the type of recording paper P is plain paper P2, i.e., in the event that the surface of the paper is not very glossy, the foregoing reflected light will be reflected in diffuse fashion at recording paper P (see FIG. 5(b)). That is, when there is not much difference between the amount of light received by first light receiving element 92 and the amount of light received by second light receiving element 93, it will be possible to determine that the type of recording paper P is plain paper P2.

In addition, the transport altering means 78 of the present embodiment receives output from recording medium type detection means 76 and alters transport operations in connection with transport of recording paper P in correspondence to the aforementioned type of recording paper P when operations resume following interruption of image forming operations. More specifically, if the type of recording paper P is special-purpose inkjet paper P1, recording paper P undergoes normal transport when operations resume so as to permit image forming operations which were underway at recording paper P to resume. Conversely, if the type of recording paper P is plain paper P2, recording paper P is forcibly discharged when operations resume. In other words, if the type of recording paper P is special-purpose inkjet paper P1, due to the presence of ink receiving layer 100 at the surface of the paper there will be almost no swelling of recording paper P and there will likewise be almost no bowing thereof Because when operations resume it is therefore possible to resume image forming operations which were underway at recording paper P, normal transport of recording paper P is carried out. Conversely, if the type of recording paper P is plain paper P2, due to the lack of an ink receiving layer 100 at the surface of the paper, swelling of recording paper P, and likewise bowing thereof, will be significant. Since there is therefore a significant possibility that recording paper P has or would come in contact with printhead 52, and since resumption, when operations resume, of the image forming operations which were underway at recording paper P would therefore most likely only result in waste of recording paper P and/or waste of ink, recording paper P is forcibly discharged.

Figure 6:
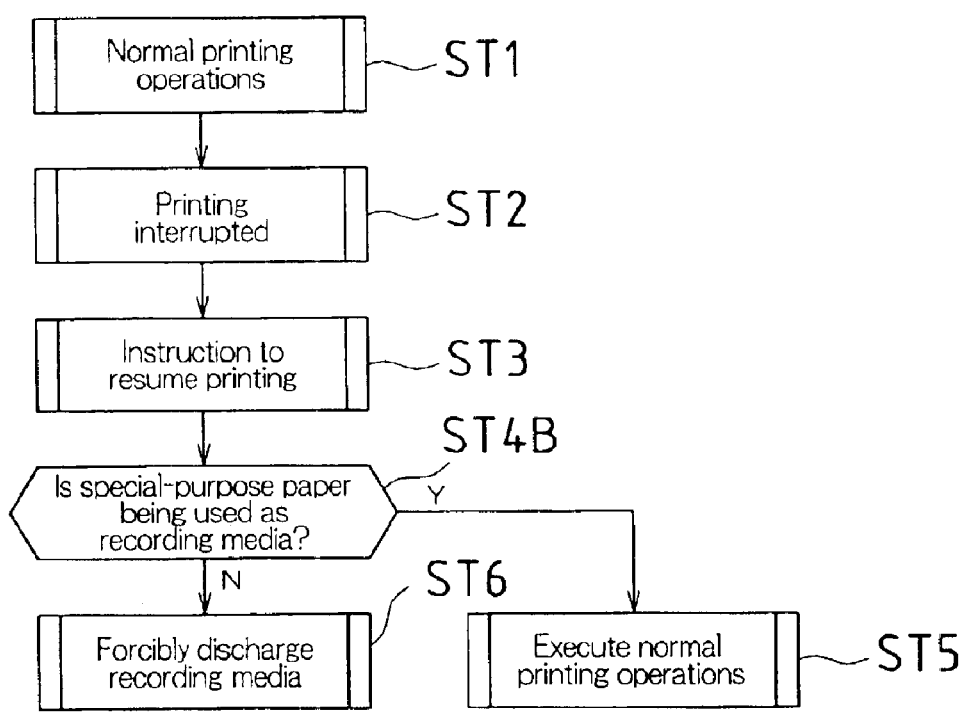
FIG. 6 is a flowchart showing a control procedure which may be employed when image forming operations are interrupted in the context of the second embodiment.

Following the flowchart of FIG. 6, a control procedure which may be employed in the context of the present embodiment when image forming operations are interrupted will next be described. Operations at steps ST1 through ST3 of the present flowchart are similar to those at the aforementioned first embodiment. But, at step ST3, when instruction to resume image forming operations (instruction to resume printing) is issued to CPU 7, transport altering means 78 receives output from recording medium type detection means 76 and determines whether the type of recording paper P is special-purpose inkjet paper P1 (step ST4B). Here, if recording paper P is special-purpose inkjet paper P1, normal transport of recording paper P is carried out so as to permit image forming operations which were underway at recording paper P to resume (step ST5). On the other hand, if recording paper P is plain paper P2, recording paper P is forcibly discharged (step ST6).

As described above, at time(s) when image forming operation(s) have been interrupted, there will be greater likelihood that recording paper P will come in contact with printhead 52 during the course of the interruption(s) if type(s) of recording paper P is or are plain paper P2. In the present embodiment, image forming operation(s) which was or were underway at recording paper P will therefore be resumed if recording paper P is special-purpose inkjet paper P1, but recording paper P will be forcibly discharged if recording paper P is plain paper P2. This permits elimination, when recording paper P is special-purpose inkjet paper P1, of situations where recording paper P would go to waste and/or situations where image forming operation(s) which occurred prior to interruption(s) would go to waste. Furthermore, this also permits elimination, when recording paper P is plain paper P2, of resumption of image forming operations on smeared or otherwise dirtied recording paper P.

(Third Embodiment)

A third embodiment will next be described. At the foregoing first embodiment, when operations resumed following interruption of image forming operations, transport operations affecting recording paper P were altered in correspondence to print coverage up to that point. Furthermore, at the foregoing second embodiment, transport operations affecting recording paper P were altered in correspondence to type of recording paper P. In the present embodiment, transport operations affecting recording paper P are instead altered in correspondence to interruption time(s), such interruption time(s) being time(s) elapsed from time(s) of interruption of image forming operation(s) to time(s) when operation(s) resume. As constitution and operation are in other respects similar to the foregoing respective embodiments, description will here be carried out only with respect to those aspects of constitution and operation which differ from those respective embodiments.

Figure 3C:
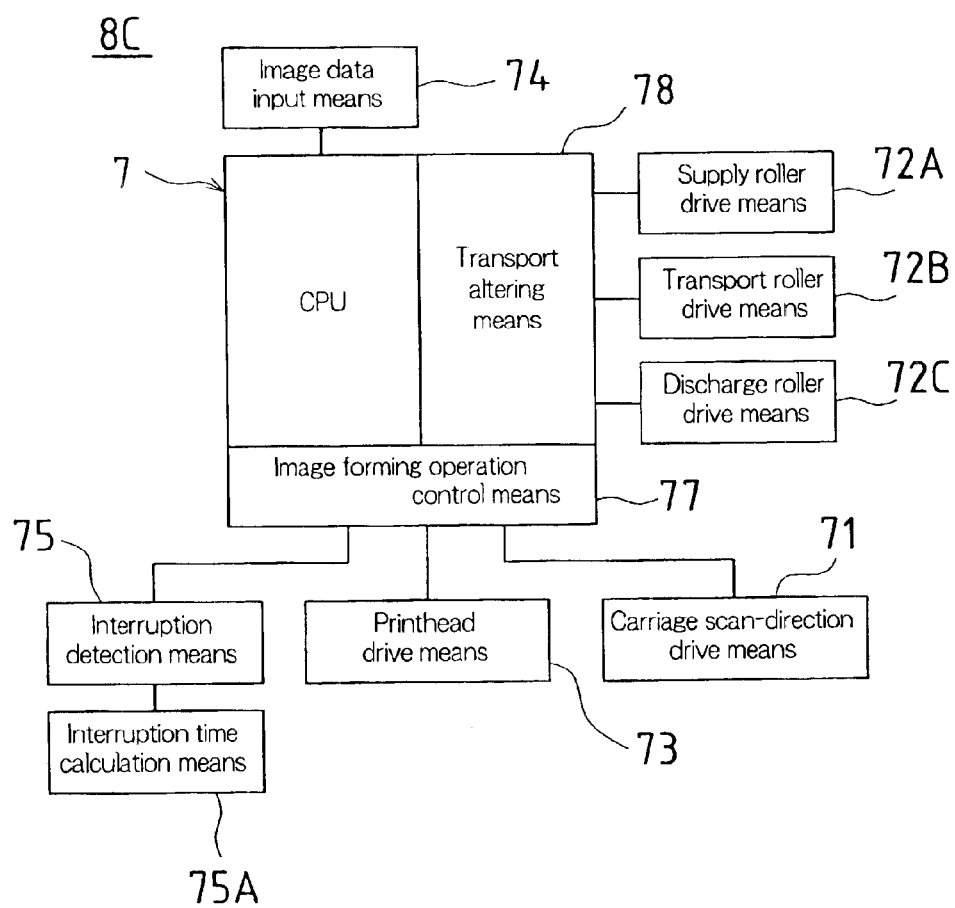
FIG. 3(c) is a block diagram showing the constitution of a controller for a color inkjet printer associated with a third embodiment.

FIG. 3(c) is a block diagram showing the constitution of a controller 8C for a color inkjet printer 1 associated with the present embodiment. This controller 8C is equipped with interruption time calculation means 75A instead of the print coverage determination means 73A with which controller 8A of the first embodiment (see FIG. 3(a)) was equipped or the recording medium type detection means 76 with which controller 8B of the second embodiment (see FIG. 3(b)) was equipped. This interruption time calculation means 75A is capable of calculating interruption time(s), such interruption time(s) being time(s) elapsed from time(s) of interruption of image forming operation(s) to time(s) when operation(s) resume. More specifically, interruption time calculation means 75A is equipped with timer(s) which begin counting time from time(s) when image forming operation(s) are interrupted, determination of timer value(s) at time(s) when operations resume permitting calculation of interruption time(s).

In addition, the transport altering means 78 of the present embodiment receives output from interruption time calculation means 75A and alters transport operations in connection with transport of recording paper P in correspondence to the aforementioned interruption time(s) when operations resume following interruption of image forming operations. More specifically, if interruption time(s) is or are not more than prescribed value(s) (e.g., 15 sec), recording paper P undergoes normal transport when operations resume so as to permit image forming operations which were underway at recording paper P to resume. On the other hand, if interruption time(s) exceed prescribed value(s), recording paper P is forcibly discharged when operations resume.

Figure 7:
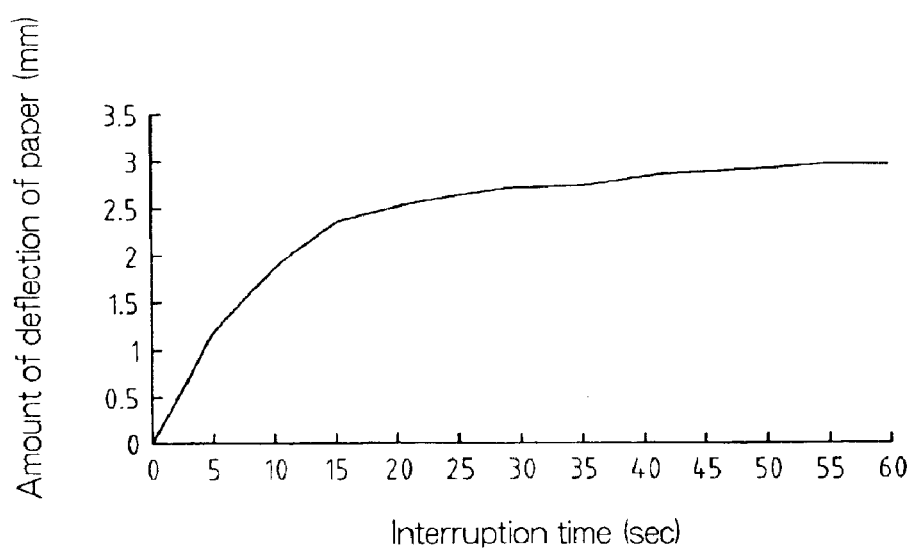
FIG. 7 is a drawing showing one example of a possible relationship between image forming operation interruption time and amount of recording paper deflection.

FIG. 7 shows one example of a possible relationship between image forming operation interruption time and amount of deflection at recording paper P. As shown in this FIG. 7, when interruption time is not more than a prescribed value (e.g., 15 sec), swelling of recording paper P will have progressed to only a comparatively small degree, and there will likewise be little bowing thereat. Because when operations resume it will therefore be possible to resume image forming operations which were underway at recording paper P, normal transport of recording paper P is carried out. Conversely, when interruption times exceeds a prescribed value, swelling of recording paper P, and likewise bowing thereof, will be significant. Since there would therefore be a significant possibility that recording paper P has or would come in contact with printhead 52, and since resumption, when operations resume, of the image forming operations which were underway at recording paper P would therefore most likely only result in waste of recording paper P and/or waste of ink, recording paper P is forcibly discharged.

Figure 8:
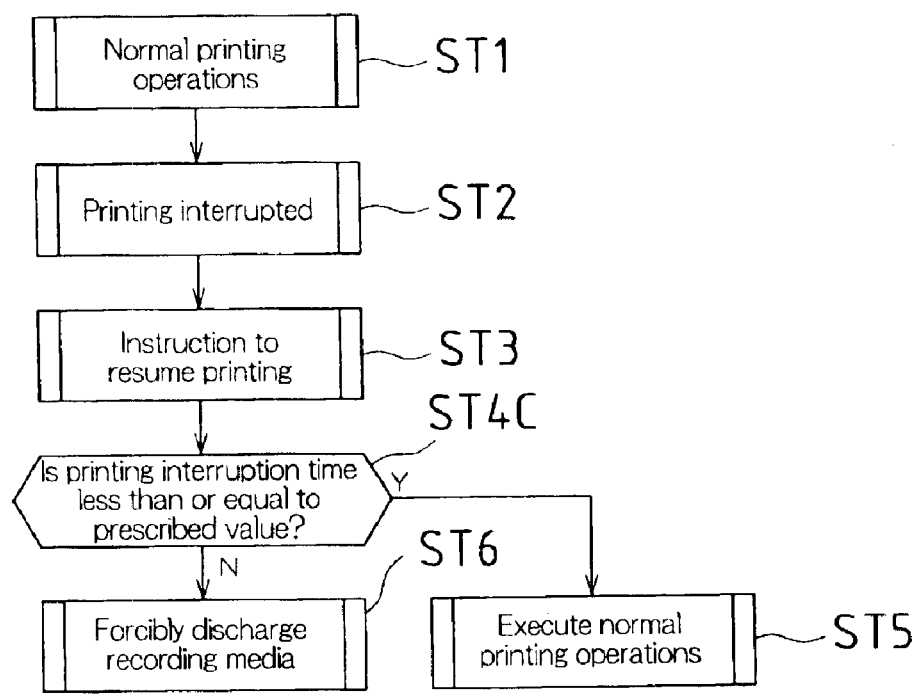
FIG. 8 is a flowchart showing a control procedure which may be employed when image forming operations are interrupted in the context of the third embodiment.

Following the flowchart of FIG. 8, a control procedure which may be employed in the context of the present embodiment when image forming operations are interrupted will next be described. Operations at steps ST1 through ST3 of the present flowchart are similar to those at the aforementioned first embodiment. But, at step ST3, when instruction to resume image forming operations (instruction to resume printing) is issued to CPU 7, transport altering means 78 receives output from interruption time calculation means 75A and determines whether interruption time(s) is or are not more than prescribed value(s) (step ST4C). Here, if interruption time(s) is or are not more than prescribed value(s), normal transport of recording paper P is carried out so as to permit image forming operations which were underway at recording paper P to resume (step ST5). On the other hand, if interruption time(s) exceed prescribed value (s), recording paper P is forcibly discharged (step ST6).

As described above, in the present embodiment, image forming operation(s) which was or were underway at recording paper P will therefore be resumed only if interruption time(s) was or were not more than prescribed value(s), recording paper P otherwise (i.e., where there is a high likelihood that recording paper P has or would come in contact with printhead 52) being forcibly discharged. This permits elimination, when interruption time(s) is or are not more than prescribed value(s), of situations where recording paper P would go to waste and/or situations where image forming operation(s) which occurred prior to interruption(s) would go to waste. Furthermore, this also permits elimination, when interruption time(s) exceed prescribed value(s), of resumption of image forming operations on smeared or otherwise dirtied recording paper P.

(Fourth Embodiment)

A fourth embodiment will next be described. The present embodiment is equipped with a combination of the constitutions at the aforementioned respective first through third embodiments. That is, when operations resume following interruption of image forming operations, transport operations affecting recording paper P may be altered in correspondence to, respectively, print coverage up to that point, type of recording paper P, and/or interruption time.

Figure 3D:
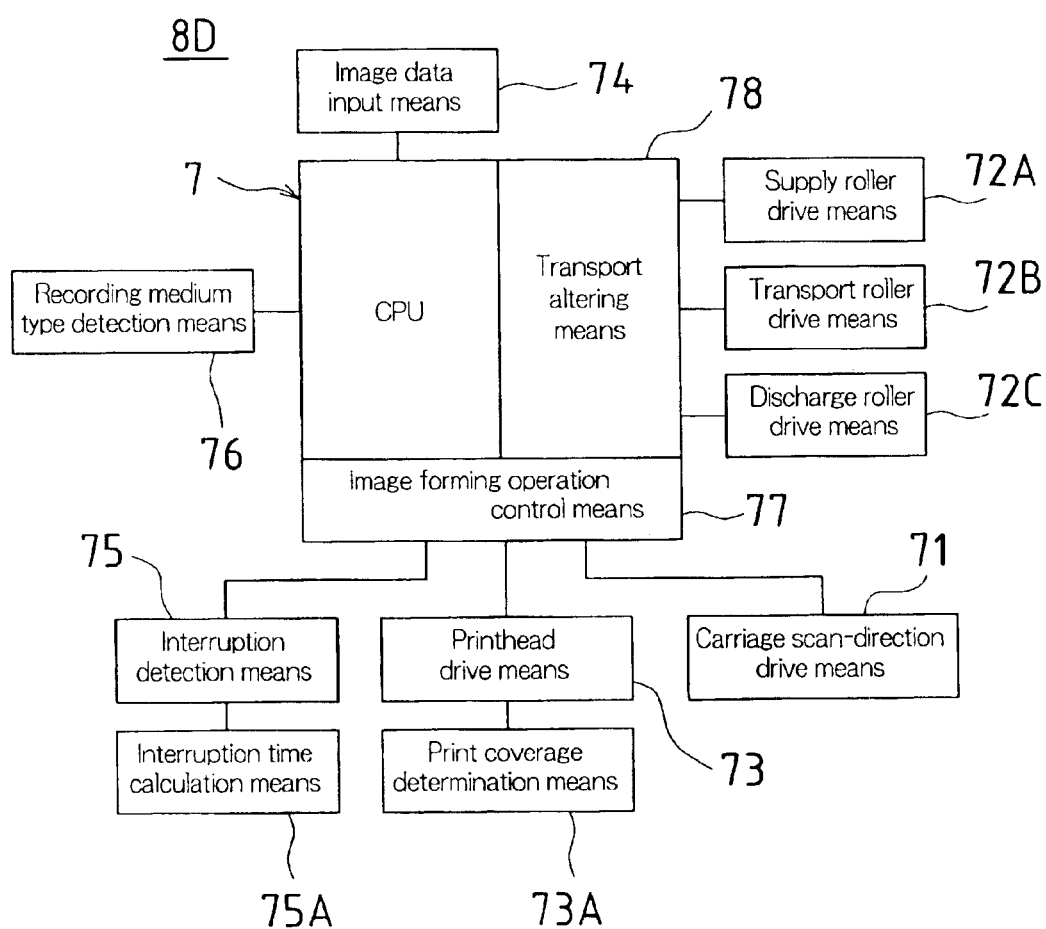
FIG. 3(d) is a block diagram showing the constitution of a controller for a color inkjet printer associated with a fourth embodiment.

FIG. 3(d) is a block diagram showing the constitution of a controller 8D for a color inkjet printer 1 associated with the present embodiment. This controller 8D is equipped with the print coverage determination means 73A with which controller 8A of the first embodiment (see FIG. 3(a)) was equipped, the recording medium type detection means 76 with which controller 8B of the second embodiment (see FIG. 3(b)) was equipped, and the interruption time calculation means 75A with which controller 8C of the third embodiment (see FIG. 3(c)) was equipped.

Furthermore, one characteristic of the present embodiment is the fact that, of transport roller pair 42 and discharge roller 61 which are located to either side of printhead 52 in the recording paper transport direction, discharge roller 61 is first driven and rotated, following which—after a prescribed time (e.g., 1 sec) has elapsed—transport roller pair 42 is thereafter driven and rotated, when operations resume following interruption of image forming operations. That is, even where conditions are such as to cause bowing of recording paper P, bowing of recording paper P can be mitigated by first causing discharge roller 61 which is or are downstream in the recording paper transport direction to rotate when operations resume following interruption of image forming operations. By thereafter starting rotation of transport roller pair 42 which is upstream in the recording paper transport direction, it is possible to resume transport operations while recording paper P is maintained in a flat state. In such case, because the force with which the nip formed by transport roller pair 42 grabs recording paper P is set so as to be greater than the force with which the nip formed by discharge roller 61 grabs recording paper P, a situation in which recording paper P might be transported as recording paper P slipped passed transport roller pair 42 when only discharge roller 61 is driven and rotated does not occur.

Figure 9:
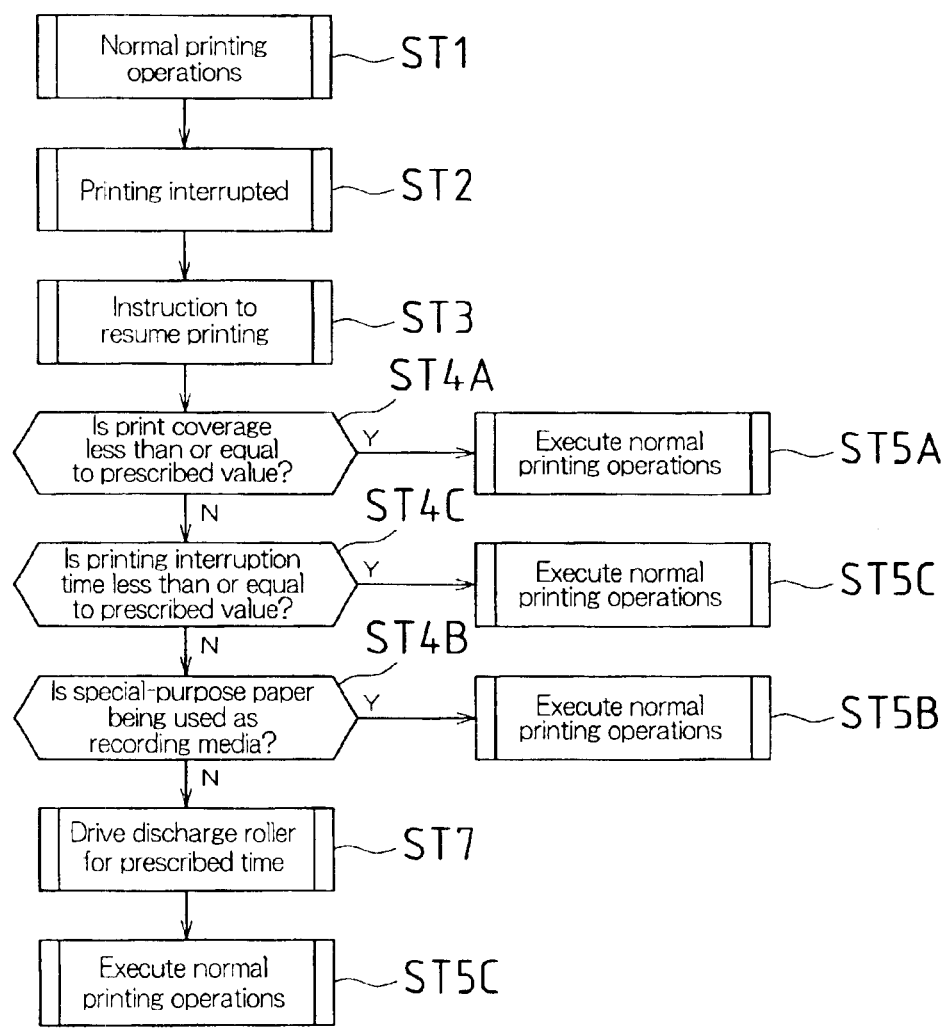
FIG. 9 is a flowchart showing a control procedure which may be employed when image forming operations are interrupted in the context of the fourth embodiment.
Figure 10:
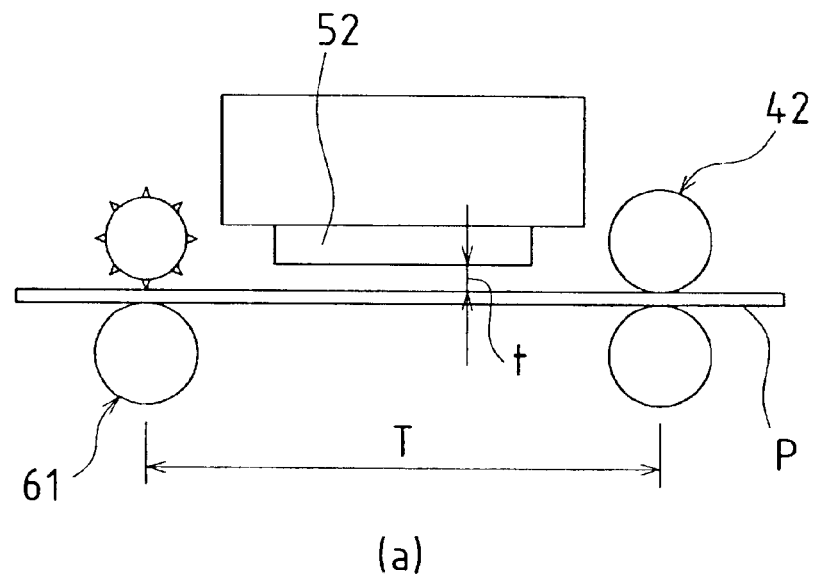
FIG. 10(a) is a drawing showing an image forming unit in a situation where bowing of recording paper is not occurring.
FIG. 10(b) is a drawing showing an image forming unit in a situation where bowing of recording paper is occurring.
Figure 10:
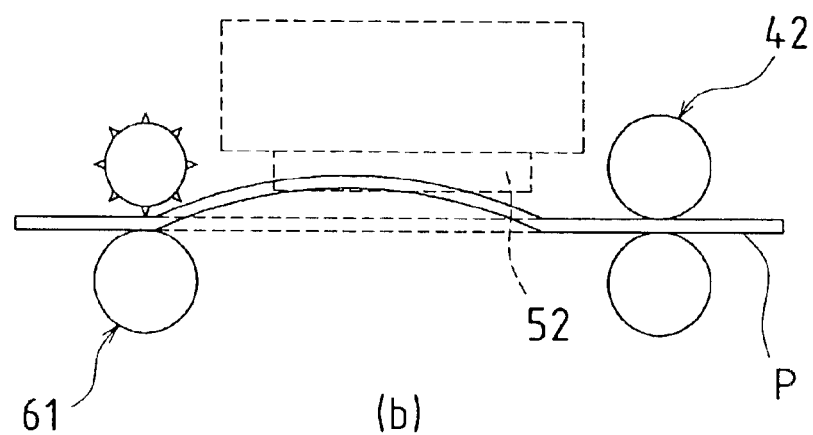

Following the flowchart of FIG. 9, a control procedure which may be employed in the context of the present embodiment when image forming operations are interrupted is described below. Operations at steps ST1 through ST3 of the present flowchart are also similar to those at the aforementioned first embodiment. Furthermore, at step ST3, when instruction to resume image forming operations (instruction to resume printing) is issued to CPU 7, transport altering means 78 receives output from print coverage determination means 73A and determines whether print coverage(s) at recording paper P prior to interruption of image forming operations was or were not more than prescribed value(s) (step ST4A). Here, if print coverage(s) is or are not more than prescribed value(s), normal transport of recording paper P is carried out so as to permit image forming operations which were underway at recording paper P to resume (step ST5A). On the other hand, if print coverage(s) exceed prescribed value(s), processing proceeds to step ST4C.

At this step ST4C, transport altering means 78 receives output from interruption time calculation means 75A and determines whether interruption time(s) was or were not more than prescribed value(s). Here, if interruption time(s) is or are not more than prescribed value(s), normal transport of recording paper P is carried out so as to permit image forming operations which were underway at recording paper P to resume (step ST5C). On the other hand, if interruption time(s) exceed prescribed value(s), processing proceeds to step ST4B.

Moreover, at this step ST4B, transport altering means 78 receives output from recording medium type detection means 76 and determines whether the type of recording paper P is special-purpose inkjet paper P1. Here, if recording paper P is special-purpose inkjet paper P1, normal transport of recording paper P is carried out so as to permit image forming operations which were underway at recording paper P to resume (step ST5B). On the other hand, if recording paper P is plain paper P2, processing proceeds to step ST7. At this step ST7, as was the case above, discharge roller 61 is driven and rotated prior to the driving and rotation of transport roller pair 42. This makes it possible to mitigate bowing of recording paper P, placing it in a flat state, following which processing proceeds to step ST5C, at which transport roller pair 42 is driven and rotated, and recording paper P is made to undergo normal transport so as to permit image forming operations which were underway at recording paper P to resume.

The present embodiment is thus such that, in the event that image forming operations are interrupted, discharge roller 61 is driven and rotated prior to driving and rotation of transport roller pair 42 as a prelude to normal transport of recording paper P, only when print coverage(s) exceed prescribed value(s), interruption time(s) exceed prescribed value(s), and type(s) of recording paper P is or are plain paper P2. In other words, under conditions where it is likely that significant bowing of recording paper P has occurred or will occur, such bowing is mitigated before proceeding to normal image forming operations. This makes it possible to avoid situations where image forming operations might have been resumed while bowing was still present at recording paper P, permitting achievement of satisfactory image forming operations.

Note that whereas in this fourth embodiment bowing was mitigated before proceeding to normal image forming operations under conditions where it was likely that significant bowing of recording paper P had occurred or would occur, since under such circumstances it is possible that recording paper P has come in contact with printhead 52, recording paper P may alternatively be forcibly discharged.

(Other Embodiments)

The foregoing embodiments were described in terms of application of the present invention to a color inkjet printer 1. The present invention is, however, not limited to thereto, it being possible, for example, to apply the present invention to a monochrome-type inkjet printer.

Furthermore, the present invention is not limited to serial-type inkjet printers in which image forming operations are carried out as carriage 51 is scanned in a scan direction, but may also be applied to line-type inkjet printers which did not employ such scanning action.

Furthermore, in the foregoing fourth embodiment, controller 8D of color inkjet printer 1 was equipped with print coverage determination means 73A, recording medium type detection means 76, and interruption time calculation means 75A; and furthermore, upon resumption of operations, rotation of discharge roller 61 which was downstream in the recording paper transport direction was made to commence before the start of rotation of transport roller pair 42 which was upstream in the recording paper transport direction. The present invention is however not limited hereto, it being possible for only any two of the three means represented by print coverage determination means 73A, recording medium type detection means 76, and interruption time calculation means 75A to be provided thereat. Furthermore, operations whereby rotation of discharge roller 61 is made to commence before the start of rotation of transport roller pair 42 may also be applied to any of the foregoing respective embodiments other than the fourth embodiment.

As described above, when image forming operations have been interrupted, the present invention makes it possible to recognize—in correspondence to circumstances of image forming operations occurring prior to such interruption, circumstances at the point in time at which operations are resumed, and so forth—whether conditions are such as would make occurrence of bowing due to swelling of recording paper likely, and makes it possible to appropriately select transport mode(s) for recording medium or media when operations are resumed thereafter. More specifically, transport mode(s) for recording medium or media when operations are resumed is or are appropriately selected in correspondence to print coverage(s) at recording medium or media prior to interruption of image forming operations, type(s) of recording medium or media, interruption time(s) which is or are time(s) elapsed from time(s) of interruption of image forming operations to time(s) when operations resume, and/or the like. This makes it possible, when the amount of deflection accompanying swelling of recording medium or media is comparatively small (i.e., when continuation of image forming operations would be unlikely to produce ill effect), to eliminate situations where recording medium or media would go to waste and/or situations where image forming operations occurring prior to interruption(s) would go to waste. Furthermore, this makes it possible, when the amount of deflection accompanying swelling of recording medium or media is comparatively large (i.e., when it is likely that recording medium or media have or would come in contact with printhead(s)), to eliminate situations where image forming operations would have been resumed on smeared or otherwise dirtied recording medium or media. In particular, whereas increased distance between shafts of rollers in accompaniment to increased number of nozzles at printhead(s) has the effect of tending to increase the amount of deflection of recording medium or media, the present invention makes it possible to avoid adverse effects due to such deflection accompanying swelling of recording medium or media.

Furthermore, rotation of discharge roller(s) which is or are downstream in the recording medium transport direction may be made to commence before the start of rotation of transport roller(s) which is or are upstream in the recording medium transport direction when operations are resumed following interruption of image forming operations. This will make it possible, during resumption of operations, to mitigate bowing of recording medium or media and resume transport operations while maintaining recording medium or media in a flat state, permitting satisfactory maintenance of image quality.

The present invention may be embodied in a wide variety of forms other than those presented herein without departing from the spirit or essential characteristics thereof. The foregoing embodiments and working examples, therefore, are in all respects merely illustrative and are not to be construed in limiting fashion. The scope of the present invention being as indicated by the claims, it is not to be constrained in any way whatsoever by the body of the specification. All modifications and changes within the range of equivalents of the claims are moreover within the scope of the present invention.

Moreover, the present application claims right of benefit of prior filing date of Japanese Patent Application No. 2002-152735, the content of which is incorporated herein by reference in its entirety. Furthermore, all references cited in the present specification are specifically incorporated herein by reference in their entirety.

What is claimed is:

1. In the context of an inkjet image forming apparatus employing ink droplets jetted from one or more printheads to form one or more images on one or more recording media, an inkjet image forming apparatus characterized in that it is equipped with one or more interruption detection means capable of detecting one or more interruptions of one or more image forming operations;

one or more print coverage determination means capable of determining one or more print coverages applicable to at least one of the recording medium or media at one or more times prior to at least one of the interruption or interruptions of image forming operation or operations; and one or more transport altering means capable of receiving output from at least one of the print coverage determination means and capable of, at one or more times when operation or operations resume following at least one of the interruption or interruptions of image forming operation or operations, altering one or more recording medium transport operations in correspondence to at least one of the print coverage or coverages.

2. An inkjet image forming apparatus according to claim 1, the inkjet image forming apparatus being characterized in that at least one of the transport altering means is constructed so as to cause at least one of the recording medium or media to undergo normal transport so as to permit at least one of the image forming operation or operations which was underway on at least one of the recording medium or media to resume at at least one of the time or times when operation or operations resume in the event that at least one of the print coverage or coverages applicable to at least one of the recording medium or media determined by at least one of the print coverage determination means at at least one of the time or times prior to at least one of the interruption or interruptions of image forming operation or operations is not more than one or more prescribed values; but so as to cause forced discharge of at least one of the recording medium or media at at least one of the time or times when operation or operations resume in the event that at least one of the print coverage or coverages exceeds at least one of the prescribed value or values.

3. In the context of an inkjet image forming apparatus employing ink droplets jetted from one or more printheads to form one or more images on one or more recording media, an inkjet image forming apparatus characterized in that it is equipped with one or more interruption detection means capable of detecting one or more interruptions of one or more image forming operations;

one or more type detection means capable of detecting at least one type of at least one of the recording medium or media; and one or more transport altering means capable of receiving output from at least one of the type detection means and capable of, at one or more times when operation or operations resume following at least one of the interruption or interruptions of image forming operation or operations, altering one or more recording medium transport operations in correspondence to at least one of the type or types of recording medium or media.

4. An inkjet image forming apparatus according to claim 3, the inkjet image forming apparatus being characterized in that at least one of the transport altering means is constructed so as to cause at least one of the recording medium or media to undergo normal transport so as to permit at least one of the image forming operation or operations which was underway on at least one of the recording medium or media to resume at at least one of the time or times when operation or operations resume in the event that at least one of the type or types of recording medium or media detected by at least one of the type detection means is special-purpose inkjet paper; but so as to cause forced discharge of at least one of the recording medium or media at at least one of the time or times when operation or operations resume in the event that at least one of the type or types of recording medium or media is plain paper.

5. In the context of an inkjet image forming apparatus employing ink droplets jetted from one or more printheads to form one or more images on one or more recording media, an inkjet image forming apparatus characterized in that it is equipped with one or more interruption detection means capable of detecting one or more interruptions of one or more image forming operations;

one or more interruption time calculation means capable of calculating one or more interruption times, each such interruption time being a time elapsed from one of the time or times of interruption of image forming operation or operations to one of one or more times when operation or operations resume; and one or more transport altering means capable of receiving output from at least one of the interruption time calculation means and capable of, at at least one of the time or times when operation or operations resume following at least one of the interruption or interruptions of image forming operation or operations, altering one or more recording medium transport operations in correspondence to at least one of the interruption time or times.

6. An inkjet image forming apparatus according to claim 5, the inkjet image forming apparatus being characterized in that at least one of the transport altering means is constructed so as to cause at least one of the recording medium or media to undergo normal transport so as to permit at least one of the image forming operation or operations which was underway on at least one of the recording medium or media to resume at at least one of the time or times when operation or operations resume in the event that at least one of the interruption time or times calculated by at least one of the interruption time calculation means is not more than one or more prescribed values; but so as to cause forced discharge of at least one of the recording medium or media at at least one of the time or times when operation or operations resume in the event that at least one of the interruption time or times exceeds at least one of the prescribed value or values.

7. In the context of an inkjet image forming apparatus employing ink droplets jetted from one or more printheads to form one or more images on one or more recording media, an inkjet image forming apparatus characterized in that it is equipped with one or more interruption detection means capable of detecting one or more interruptions of one or more image forming operations;

at least two species of means selected from among the group of three species of means consisting of one or more print coverage determination means capable of determining one or more print coverages applicable to at least one of the recording medium or media at one or more times prior to at least one of the interruption or interruptions of image forming operation or operations, one or more type detection means capable of detecting at least one type of at least one of the recording medium or media, and one or more interruption time calculation means capable of calculating one or more interruption times, each such interruption time being a time elapsed from one of the time or times of interruption of image forming operation or operations to one of one or more times when operation or operations resume; and one or more transport altering means capable of receiving output from the at least two species of means and capable of, at one or more times when operation or operations resume following at least one of the interruption or interruptions of image forming operation or operations, altering one or more recording medium transport operations in correspondence to output from the at least two species of means.

8. An inkjet image forming apparatus according to any one of claims 1 through 7, the inkjet image forming apparatus being characterized in that at least two transport rollers are respectively provided in at least one transport path of at least one of the recording medium or media, at least one transport roller being provided upstream of and at least one transport roller being provided downstream of at least one of the printhead or printheads; and at least one of the transport altering means is constructed such that rotation of at least one of the downstream transport roller or rollers commences before the start of rotation of at least one of the upstream transport roller or rollers at at least one of the time or times when operation or operations resume following at least one of the interruption or interruptions of image forming operation or operations.

9. In the context of an inkjet image forming method wherein ink droplets are jetted from one or more printheads to form one or more images on one or more recording media, an inkjet image forming method characterized in that at one or more times when operation or operations resume following one or more interruptions of image forming operation or operations, recording medium transport operation or operations occur through control executed by at least one of the transport altering means in an inkjet image forming apparatus according to claim 8.

10. In the context of an inkjet image forming method wherein ink droplets are jetted from one or more printheads to form one or more images on one or more recording media, an inkjet image forming method characterized in that at one or more times when operation or operations resume following one or more interruptions of image forming operation or operations, recording medium transport operation or operations occur through control executed by at least one of the transport altering means in an inkjet image forming apparatus according to any one of claims 1 through 7.

* * * * *